ations in some measure, the propane is condensed

United States Patent Office 2,841,564
Patented July 1, 1958

2,841,564

ALUMINA DESICCANT AND PROCESS FOR PREPARATION THEREOF

John G. Miller, Philadelphia, Pa., and James V. Weir, Merchantville, N. J., assignors to Porocel Corporation, Philadelphia, Pa., a corporation of Delaware No Drawing. Application May 5, 1953
Serial No. 353,238

14 Claims. (Cl. 252—463)

The present invention relates to drying gaseous and liquid hydrocarbons, and more particularly it relates to drying paraffinic hydrocarbons or hydrocarbon mixtures containing sulfur compounds which normally are converted into hydrogen sulfide upon contact with activated alumina desiccants.

The removal of water, dissolved or entrained, from a wide variety of paraffinic hydrocarbons, both unsubstituted and substituted, is of considerable importance in commercial refining or production of such hydrocarbons. This is exemplified by the practice of drying natural gas, liquified propane which is known in the industry as liquified petroleum gas, gasoline, naphtha, kerosine, furnace oil, and halogenated paraffinic hydrocarbon such as Freon. Water is detrimental to product quality for the reason, among other things, that it frequently causes serious corrosion of metallic surfaces such as pipes, tanks, etc., with which the hydrocarbons come in contact during storage and use.

One of the most widely employed methods of drying such essentially paraffinic hydrocarbons embodies the use of a desiccant comprising activated alumina, either natural, that is activated bauxite, or synthetic. Activation of alumina heretofore has been effected merely by heating the alumina to elevated temperatures, and the various conditions of activation previously employed are fully disclosed in the prior art such, for example, as in the article by La Lande, McCarter, and Sanborn entitled "Bauxite as a Drying Adsorbent," published in Industrial and Engineering Chemistry, vol. 36, pages 99 through 109, February 1944.

Although conventional activated alumina is satisfactory for drying hydrocarbons in the case of many hydrocarbon streams, frequently, however, hydrocarbons, and particularly those derived from petroleum contain as impurities small quantities or traces of certain sulfur compounds which are not completely removed or eliminated by known desulfurization processes and which are catalytically converted upon contact with the activated alumina into hydrogen sulfide. Carbonyl sulfide, carbon disulfide and mercaptans exemplify this type of sulfur compounds. While the presence of small quantities of such sulfur compounds in the hydrocarbons usually is not particularly objectionable, the hydrogen sulfide into which such compounds are converted, by virtue of the catalytic action of the activated alumina, not only is objectionable because of its odor but also for the reason that it is highly corrosive.

By way of specific example, this problem exists in the production of liquified petroleum gas from a raw propane gas stream, such as is obtained as the effluent of catalytic polymerization of low molecular weight olefins. Such effluent comprises methane, ethane, propane, and $C_3$ polymer with relatively small amounts of sulfur compounds, particularly carbonyl sulfide, carbon disulfide, and mercaptan type sulfur compounds. After the methane and ethane is substantially separated and the propane removed from the $C_3$ polymer in accordance with well-known processing methods, the propane is condensed under pressure. Next, the liquified propane is washed with a caustic solution to remove the sulfur compounds, following which it is water washed to eliminate, in turn, entrained caustic solution. Finally, the liquified propane is dried by percolating through a bed of activated alumina, such as activated bauxite. In commercial operations, invariably minute quantities or traces of the sulfur compounds remain in the propane even after caustic treatment, and, as above pointed out, while they themselves are not objectionable in most cases, the activated alumina desiccant functions as a catalyst with respect to such sulfur compounds to convert the latter into hydrogen sulfide which cannot be tolerated for many purposes because of its repugnant odor and corrosive nature.

When the activated alumina is initially contacted by the propane to be dried, the hydrogen sulfide, formed as above described by virtue of the catalytic action of the activated alumina, is adsorbed by the alumina. The alumina, however, becomes rapidly saturated with the hydrogen sulfide, and unfortunately in many cases before more than a maximum of about 25% of the potential adsorptive capacity of the alumina has been utilized. At that point, to avoid the presence of hydrogen sulfide in the dried propane, it becomes necessary to discontinue the drying operation and regenerate the alumina by heating in accordance with usual procedures, such as described in the La Lande et al. publication, above mentioned. Thus, because of the formation of hydrogen sulfide the drying operations must be interrupted and the alumina desiccant regenerated long before the full potential or capacity of the desiccant is realized.

Accordingly, one object of the present invention is to provide an improved alumina desiccant capable of drying essentially paraffinic hydrocarbons containing certain sulfur compounds without converting the latter into hydrogen sulfide.

Another object of this invention is to provide such improved alumina desiccant having a dry gas capacity not appreciably below that of conventional activated alumina.

A further object is to provide a method of treating activated alumina to yield an improved desiccant characterized by its ability to dry paraffinic hydrocarbons without converting any sulfur compounds contained therein to hydrogen sulfide.

A still further object is to provide a method of treating activated alumina, particularly bauxite, so as to yield an improved desiccant especially suitable for drying paraffinic hydrocarbons containing sulfur compounds without converting such compounds to hydrogen sulfide.

Another object of the invention is to provide an improved method for drying hydrocarbons containing carbonyl sulfide, carbon disulfide, and mercaptan type sulfur compounds whereby substantially the full drying capacity of the desiccant may be utilized without the formation of hydrogen sulfide.

Other objects and features of this invention will be apparent from the description of the invention which follows.

We have found that activated alumina, either synthetic or natural such as bauxite, can be rendered inactive as regards the conversion of carbonyl sulfide, carbon disulfide, and mercaptan type sulfur compounds to hydrogen sulfide by treating it with a dilute solution of a mineral acid and then reactivating the treated alumina, without washing, by heating under suitable conditions to eliminate substantially any free acid remaining in the alumina. We have found further that the drying capacity, as represented by the dry gas capacity, of the alumina is not substantially decreased as a result of the acid treatment by which the alumina is rendered inactive in converting sulfur compounds to hydrogen sulfide.

Important economic advantages result from the use of the improved alumina desiccant in the drying of sundry paraffinic hydrocarbons, both unsubstituted and substituted, such as natural gas, liquified petroleum gas, gasoline, naphtha, kerosine, furnace oil, and halogenated paraffinic hydrocarbons, and which contain sulfur compounds of the type which are converted into hydrogen sulfide upon contact with conventional activated alumina. Thus, by means of our improved alumina such hydrocarbons may be dried to yield products which are substantially free of hydrogen sulfide, while utilizing the full drying capacity of the improved alumina. A correlative advantage exists in the fact that the frequency of regeneration and replacement of the desiccant is very materially reduced. For example, whereas conventional activated alumina which has been newly prepared, in some cases must be regenerated within about 8 hours in order to prevent hydrogen sulfide from appearing in the dried hydrocarbon product, under the same conditions of operation the improved alumina may be capable of effectively drying the hydrocarbons over a period of 8 days or more and at that time regeneration is necessary only because the alumina has taken on its full capacity of water and not because of hydrogen sulfide formation.

In accordance with our invention, we prepare our improved alumina desiccant by treating conventional activated alumina with a dilute solution of mineral acid. It is essential that the alumina be thermally activated in accordance with the known methods, such as fully described by La Lande et al., above referred to, prior to contact with the acid solution in order to obtain the desired results, since treatment of raw alumina with acid will not effectively eliminate the catalytic activity of the alumina as regards the conversion of the sulfur compounds to hydrogen sulfide.

The activated alumina first is reacted with a dilute solution of sulfuric, hydrochloric, or other mineral acid. The concentration of the solution may range from 4 to 20%, with 5 to 12% being preferred. This reaction may be carried out simply by adding the alumina to the solution preferably at room temperature, although higher or lower temperatures may be used, as desired. Preferably, after the alumina is completely wet with the acid solution, it is removed and the excess solution permitted to drain off. The necessary reaction between the alumina and the acid in the alumina takes place rather rapidly, for example in about 5 to 30 minutes or so, depending, to some extent, on the concentration of the acid solution and the reaction temperature. After reaction of the alumina and acid, the alumina without being washed is reactivated by heating at elevated temperature such as between 600° F. and 900° F. and preferably 750° F. for a time sufficient to eliminate any unreacted acid. It has been found that heating for about ½ hour usually is sufficient, although longer or shorter periods are satisfactory provided that substantially all of the free acid is eliminated. As above mentioned, when the activated alumina is completely wet with the acid solution, preferably, it is removed from the solution, drained, and allowed to react with the acid with which it is wetted. The characteristics of activated alumina are such that this amount will be approximately 40 to 55% by weight based on the activated alumina.

While we have described on method of reacting the alumina and acid, it is to be understood that the reaction may be carried out in other suitable ways, such as by slurrying the alumina in acid solution having a concentration of from 4 to 20% and permitting the reaction to proceed for a sufficient time to render the alumina, after final heating, inactive for conversion of the sulfur compounds into hydrogen sulfide but not so long a time as to decrease seriously the drying capacity of the activated alumina. Since the extent to which the acid treatment is carried out depends, among other things, on the type and concentration of the acid solution and also the type of alumina, it is not possible to set forth herein the optimum treating time in any particular case; however, it is usually sufficient to react the alumina in an excess acid slurry for a period of from 5 to 30 minutes or so, while in some cases reaction periods up to 12 hours have been employed without seriously decreasing the drying capacity of the activated alumina.

The acid treated alumina, as explained above, must not be washed prior to reactivation. This is essential to the present invention, since such washing nullifies the effects of the acid treatment, and consequently the alumina again would possess the undesirable characteristic of converting sulfur compounds to hydrogen sulfide.

Reactivation by heating the acid treated and unwashed alumina, as hereinbefore mentioned, is carried out under any suitable conditions such that any free acid remaining in the clay is eliminated, however, the temperature should not be so high that the adsorptive capacity of the alumina is substantially lowered. The temperatures from 600° F. to 900° F. are suitable, 750° F. being preferred.

The improved alumina desiccant is suitable for use in any conventional drying equipment such for example as in fixed bed percolation systems. Moreover, it may be regenerated to eliminate adsorbed water in accordance with the procedures for conventional alumina, for example, as disclosed in the La Lande et al. article. Thus, it may be regenerated, for instance, by heating at temperatures between 350° F. and 400° F. in dry air or by any other known method of regeneration of activated alumina desiccants.

The invention will now be described as applied to the drying of liquid propane as a step in the production of liquified petroleum gas from an available raw or unpurified propane gas stream. By way of example, in the petroleum industry liquified petroleum gas frequently is produced from the $C_3$ effluent from a catalytic polymerization plant. The effluent comprises $C_1$, $C_2$, $C_3$, and $C_3$ polymer, together with sulfur compounds as impurities, the $C_3$ polymer being the desired product of the catalytic polymerization. In accordance with known procedures, the $C_1$ and $C_2$ gas first is separated following which $C_3$ polymer is removed from the $C_3$ gas. The $C_3$ gas containing some of the sulfur compounds originally present in the catalytic polymerization effluent is condensed under pressure and then treated with caustic for the purpose of eliminating, as much as possible, the sulfur compounds. Typical of the sulfur compounds are carbonyl sulfide, carbon disulfide and mercaptans which are present in relatively small amounts usually of the order of 0.3 mol percent or so. Following the caustic treatment, the liquid propane is washed to remove entrained caustic solution. In actual practice despite the caustic treatment there usually remains in the propane traces of the sulfur compounds of the order of 0.001 to 0.02 mol percent. While this amount of sulfur compounds might appear to be insignificant, actually it is sufficient to cause the undesirable production of hydrogen sulfide hereinbefore described.

After water washing, the liquified propane is dried by percolating it through a bed of granular activated alumina. In accordance with the present invention, the alumina comprises activated alumina which has been acid treated as above described to render it inactive as regards the conversion of the remaining sulfur compounds to hydrogen sulfide. Use of the improved alumina avoids the conversion of sulfur compounds to hydrogen sulfide with the result that the drying cycle can be continued until the alumina has adsorbed its full capacity of water before regeneration thereof is necessary.

The invention may be more fully understood by means of the following examples which are not to be construed as limiting the scope of the invention.

As used herein, the term "volatile matter" shall mean the loss in weight of a sample of alumina ignited at 1800° F. to constant weight, expressed as weight percent of the starting alumina. "Dry gas capacity" is a measure of the amount of water vapor held by the desiccant up to the point where the desiccant just permits water to appear in the gas passing from it, as expressed in percent by weight of the desiccant and as determined in accordance with the method described in the publication of La Lande et al., above mentioned. "Equilibrium capacity" is a measure of the total amount of water vapor which can be removed by the desiccant from a fluid stream under constant conditions of relative humidity, temperature and pressure, expressed as weight percent of the desiccant charged and also as determined by the method described by La Lande et al.

In the following examples a lead acetate test was used to indicate the catalytic activity of the various bauxite desiccants as regards the conversion of sulfur compounds to hydrogen sulfide. In this test 9 grams of the bauxite desiccant to be tested is placed in a 125 ml. Erlenmeyer flask to which is added 27 grams of normal heptane and 3 grams of carbon disulfide. A strip of moistened lead acetate paper is hung in the flask above the liquid level and the flask is stoppered to prevent loss of any hydrogen sulfide which might be formed. Evolution of hydrogen sulfide, if any, is indicated by darkening of the lead acetate paper. After an arbitrary period of 24 hours an observation was made to determine whether the lead acetate paper had darkened.

EXAMPLE I

Several 250 gram samples of Arkansas bauxite, activated at 750° F. for ½ hour, were each treated with 250 grams of a 6% sulfuric acid solution for periods of time ranging from 5 to 30 minutes, following which they were drained but not washed and then reactivated by heating at temperatures ranging from 600° F. to 750° F. for ½ hour. Volatile matter and dry gas capacity were determined for each sample as well as for an untreated sample of the activated bauxite, and the lead acetate test also was run on all samples. The results are set forth in Table 1.

*Table 1*

| Time of Contact (Minutes) | Activation Temperature, °F. | Volatile Matter | Lead Acetate Test | Dry Gas Capacity |
|---|---|---|---|---|
| 0 | 750 | 5.5 | positive (after 15 min.). | 8.5 |
| 5 | 700 | 10.0 | positive | 6.9 |
| 10 | 750 | 9.4 | do | 6.9 |
| 15 | 600 | 14.3 | negative | 6.7 |
| 30 | 700 | 11.8 | do | 6.7 |

From the data presented in Table 1, it will be seen that the bauxite samples treated in accordance with the invention with sulfuric acid for at least 15 minutes did not cause any hydrogen sulfide to form even after 24 hours, whereas in the case of the blank the lead acetate paper had darkened within 15 minutes. While the samples which had been treated with acid for only 5 and 10 minutes, respectively, did give a positive lead acetate test after 24 hours, nevertheless they showed an improvement as regards the product of hydrogen sulfide over the blank since in each case much more than 15 minutes elapsed before the lead acetate paper darkened. It also will be noted that the dry gas capacity of the samples treated with the acid are not substantially lower than the blank and range from 6.7 to 6.9 compared with 8.5 for the untreated activated bauxite.

EXAMPLE II

The procedure of Example I was repeated except that 500 grams of the 6% sulfuric acid solution was used instead of only 250 grams. The results are set forth in Table 2.

*Table 2*

| Time of Contact (Minutes) | Activation Temperature, °F. | Volatile Matter | Lead Acetate Test | Dry Gas Capacity |
|---|---|---|---|---|
| 0 | 750 | 5.5 | positive (after 15 min.). | 8.5 |
| 5 | 700 | 10.5 | positive | 6.9 |
| 10 | 750 | 9.3 | do | 7.5 |
| 15 | 700 | 10.0 | negative | 7.0 |
| 30 | 750 | 8.7 | do | 7.6 |

From the results presented in Table 2, it will be seen that the additional amount of sulfuric acid solution had little effect upon the characteristics of the finished bauxite. Once again the bauxite samples treated with acid for at least 15 minutes gave a negative lead acetate test as compared with the blank which gave a positive test after 15 minutes.

EXAMPLE III

The procedure of Example I was again repeated except that the samples of bauxite were treated with 250 grams of a 7% sulfuric acid solution. The results are presented in Table 3.

*Table 3*

| Time of Contact (Minutes) | Activation Temperature, °F. | Volatile Matter | Lead Acetate Test |
|---|---|---|---|
| 0 | 750 | 5.5 | positive (after 15 min.). |
| 5 | 750 | 8.4 | negative. |
| 10 | 600 | 12.1 | Do. |
| 15 | 750 | 9.2 | Do. |
| 30 | 650 | 9.9 | Do. |

The data given in Table 3 indicate that when employing a 7% sulfuric acid solution, a reaction time of only 5 minutes is required to inactivate the bauxite sufficiently such that no hydrogen sulfide is formed at the end of 24 hours. On the other hand, as shown by the data in Tables 1 and 2, in the case of a 6% solution the contact time of at least 15 minutes was required to obtain a negative lead acetate test.

EXAMPLE IV

Several 50 gram samples of Surinam bauxite, activated at 750° F. for ½ hour, were treated with 45 cc. of an 18% hydrochloric acid solution for approximately 12 hours. The acid treated bauxite samples were then heated for ½ hour at various temperatures, following which they were subjected to the lead acetate test along with a sample of the untreated activated Surinam bauxite. Results are set forth in Table 4.

*Table 4*

| Sample | Activation Temperature, °F. | Lead Acetate Test |
|---|---|---|
| Blank | 750 | positive. |
| Acid-treated | 900 | negative. |
| Do | 1,050 | Do. |
| Do | 1,100 | Do. |

The fact that other mineral acids, e. g. hydrochloric acid, can be used in accordance with the invention to render the bauxite inactive is shown by the data in Table 4. The data also show that the beneficial effects obtained by the acid treatment are not destroyed by heating the bauxite at very high temperatures of the order of 1100° F. It should be understood, however, that such very high temperatures cause the adsorptive capacity of the bauxite to be very materially lowered.

EXAMPLE V

This experiment was carried out to illustrate the effect of the reactivation temperature on the equilibrium capacity of bauxite which has been acid treated in accordance with the present invention. 50 gram samples of activated Arkansas bauxite were contacted with sufficient (20 cc.) sulfuric acid solution of 10% concentration to completely cover the bauxite and after a period of 12 hours the acid treated bauxite without washing was heated for ½ hour at either 420° F. or 750° F. The resulting products together with an untreated activated bauxite sample were subjected to the lead acetate test and the equilibrium capacity thereof determined. The results are presented in Table 5.

Table 5

| Calcination Temperature | Acid Concentration Amount | Lead Acetate Test | Relative Humidity of Test, percent | Equilibrium Capacity |
|---|---|---|---|---|
| Non-acid treated Bauxite | | positive | 20 | 6.79 |
| | | | 40 | 11.30 |
| 420° F | 10%, 20 cc | negative | 20 | 2.31 |
| | | | 40 | 4.71 |
| 750° F | 10%, 20 cc | do | 20 | 4.36 |
| | | | 40 | 6.75 |

From an examination of the data presented in Table 5 it will be seen that each of the acid treated bauxite samples gave a negative lead acetate test. In the case of the sample dried at a final temperature of only 420° F., however, the equilibrium capacity was only 2.31 at 20% R. H. and 4.71 at 40% R. H., as compared with 4.36 and 6.75 for the bauxite sample heated at a temperature of 750° F.

It should be pointed out that although the lead acetate test used to indicate the activity of the desiccants in the conversion of sulfur compounds contained in paraffinic hydrocarbons to hydrogen sulfide is an artificial one in that the hydrocarbon comprised only heptane and the sulfur compound comprised only carbon disulfide in relatively high concentration, the test provides an indication of the activity of the bauxite as regards the conversion of sulfur compounds when employed in commercial operations. Thus, if a particular sample of bauxite gives a negative lead acetate test, it is inactive in the conversion of the sulfur compounds into hydrogen sulfide and in commercial operations can be used to dry various paraffinic hydrocarbons, as above mentioned, to the full drying capacity of the bauxite without noticeable production of hydrogen sulfide.

We claim:

1. A method for producing an improved desiccant for drying substantially paraffinic hydrocarbons containing carbonyl sulfide, carbon disulfide, and mercaptan type sulfur compounds comprising reacting activated alumina with a dilute solution of a mineral acid selected from the group consisting of sulfuric acid and hydrochloric acid in an amount sufficient to render it inactive for conversion of said sulfur compounds to hydrogen sulfide without substantially decreasing the dry gas capacity of said alumina after reactivation, and reactivating said alumina, without washing, by heating at a temperature and for a time sufficient to substantially eliminate any free acid remaining in said alumina.

2. The method as called for in claim 1 wherein said alumina is bauxite.

3. The method as called for in claim 1 wherein the reactivating temperature is between 600° F. and 900° F.

4. The method as called for in claim 1 wherein said mineral acid is sulfuric acid.

5. The method as called for in claim 1 wherein said dilute mineral acid solution has a concentration in the range of from 4 to 20% and is in an amount equal to at least 40% of the weight of said activated alumina.

6. An improved desiccant for drying substantially paraffinic hydrocarbons containing carbonyl sulfide, carbon disulfide, and mercaptan type sulfur compounds produced by reacting activated alumina with a dilute solution of a mineral acid selected from the group consisting of sulfuric acid and hydrochloric acid in an amount sufficient to render it inactive for conversion of said sulfur compounds to hydrogen sulfide without substantially decreasing the dry gas capacity of said alumina after reactivation, and reactivating said alumina, without washing, by heating at a temperature and for a time sufficient to substantially eliminate any free acid remaining in said alumina.

7. The improved desiccant as called for in claim 6 wherein said alumina is bauxite.

8. The improved desiccant as called for in claim 6 wherein the reactivating temperature is between 600° F. and 900° F.

9. The improved desiccant as called for in claim 6 wherein said mineral acid is sulfuric acid.

10. The improved desiccant as called for in claim 6 wherein said dilute mineral acid solution has a concentration in the range of from 4 to 20% and is in an amount equal to at least 40% of the weight of said activated alumina.

11. A method for producing an improved desiccant for drying substantially paraffinic hydrocarbons containing carbonyl sulfide, carbonyl disulfide, and mercaptan type sulfur compounds comprising reacting activated alumina with a dilute solution of a mineral acid selected from the group consisting of sulfuric acid and hydrochloric acid having a concentration in the range of from 4 to 20 percent and in an amount of at least 40 percent of the weight of said activated alumina, and reactivating said alumina, without washing, by heating said alumina at a temperature between 600° F. and 900° F.

12. The method, as called for in claim 11, wherein said mineral acid is sulfuric acid.

13. An improved desiccant for drying substantially paraffinic hydrocarbons containing carbonyl sulfide, carbonyl disulfide, and mercaptan-type sulfur compounds produced by reacting activated alumina with a dilute solution of a mineral acid selected from the group consisting of sulfuric acid and hydrochloric acid having a concentration in the range of from 4 to 20 percent and in an amount of at least 40 percent of the weight of said activated alumina, and reactivating said alumina, without washing, by heating said alumina at a temperature between 600° F. and 900° F.

14. The improved desiccant, as called for in claim 13, wherein said mineral acid is sulfuric acid.

References Cited in the file of this patent

UNITED STATES PATENTS

| | | |
|---|---|---|
| 1,781,265 | Baylis | Nov. 11, 1930 |
| 1,913,938 | Metzger et al. | June 13, 1933 |
| 1,976,127 | Haber | Oct. 9, 1934 |
| 2,015,593 | Derr | Sept. 24, 1935 |
| 2,044,341 | Wollner | June 16, 1938 |
| 2,194,186 | Pier et al. | Mar. 19, 1940 |
| 2,273,350 | Fry et al. | Feb. 17, 1942 |
| 2,375,596 | Strickland | May 8, 1945 |
| 2,440,784 | Perdew | May 4, 1948 |
| 2,485,626 | Mills | Oct. 25, 1949 |
| 2,560,931 | Chapman et al. | July 17, 1951 |
| 2,579,576 | Hickey | Dec. 25, 1951 |
| 2,584,103 | Pines et al. | Feb. 5, 1952 |
| 2,664,202 | Bartleson | Dec. 29, 1953 |